(12) United States Patent
Shimizu et al.

(10) Patent No.: US 6,469,293 B1
(45) Date of Patent: Oct. 22, 2002

(54) MULTIPROBE AND SCANNING PROBE MICROSCOPE

(75) Inventors: Nobuhiro Shimizu; Hiroshi Takahashi; Yoshiharu Shirakawabe; Chiaki Yasumuro; Tadashi Arai, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/514,096

(22) Filed: Feb. 28, 2000

(30) Foreign Application Priority Data

Mar. 16, 1999 (JP) .......................................... 11-070925

(51) Int. Cl.[7] ................................................. H01J 5/16
(52) U.S. Cl. ....................................... 250/234; 250/306
(58) Field of Search ................................. 250/234, 216, 250/306, 307; 73/579, 649, 651, 105

(56) References Cited

U.S. PATENT DOCUMENTS 5,329,122 A * 7/1994 Sakai et al. ................. 250/306
5,565,847 A * 10/1996 Gambino et al. ........ 340/572.6

* cited by examiner

Primary Examiner—Kevin Pyo
(74) Attorney, Agent, or Firm—Adams & Wilks

(57) ABSTRACT

A multiprobe device is provided for a scanning probe instrument and has a plurality of individually-selectable probe members for conducting scanning probe operations. The multiprobe has a plurality of cantilever probes supported by a support member. Each of the cantilevers is individually-selectable for use in conducting scanning probe operations, and each has a different resonance frequency from the others. In a preferred embodiment, portions of the respective cantilevers that are brought into contact with a sample to conduct scanning probe operations are arranged in a substantially linear configuration. A given one of the cantilevers is selected by vibrating the multiprobe at the resonance frequency of the given cantilever.

27 Claims, 9 Drawing Sheets

MULTIPROBE AND SCANNING PROBE MICROSCOPE

BACKGROUND OF THE INVENTION

1. Field of the Invention

The present invention relates to a multiprobe formed by providing a plurality of cantilevers on the same body in such a manner to allow selective use of each cantilever and to a scanning probe microscope utilizing the same.

2. Description of the Related Art

In scanning probe microscopes that are conventionally used for finding changes in a surface configuration, a physical quantity and the like of a microscopic region on the order of atoms, a probe which has a scanning needle on an end thereof or which has no such needle has been used as a scanning probe. In general, a probe of this type is fabricated in a cantilevered configuration to measure a configuration or the like of a surface of a sample by detecting the deflection of a cantilever due to an attraction force or repulsion force originating from an interatomic force generated between the surface of the sample and the scanning needle while when the cantilever is scanned across the sample surface.

A cantilever as described above must be replaced with a new one appropriately depending on the period of use because it is a wearable component, and it may be required to modify the cantilever depending on the purpose of measurement. There has been a problem in that the replacement of a probe is difficult and troublesome because it is a very small component. In order to solve this problem, multiprobes have been used which are formed by providing a plurality of cantilevers on the same body.

Known configurations of conventional multiprobes used for such a purpose include a configuration wherein a piezoelectric element for switching is provided for each of a plurality of cantilevers provided on the same body and those piezoelectric elements are selectively driven to allow only a desired cantilever to scan a surface of a sample and a configuration wherein a plurality of cantilevers are provided with different lengths and are sequentially used in the order of their decreasing lengths with cantilevers once used being broken and removed (or wherein long cantilevers are broken to prevent them from hindering the use of a desired cantilever).

However, the above-described known configurations have a problem in that the cost of a probe is increased by a complicated structure and operation attributable to the need for a switching mechanism utilizing a piezoelectric material such as ZnO and PZT and in that a need for a control system for selecting cantilevers leads to an increase in cost.

The latter configuration also has a problem in that the need for breaking unnecessary cantilevers reduces ease of operation and in that cantilevers can be broken by mistake when unnecessary cantilevers are broken because the component is very small and this makes it difficult to treat the component.

It is an object of the invention to provide a multiprobe in which the above-described problems with the prior art can be solved and a scanning probe microscope utilizing the same.

SUMMARY OF THE INVENTION

In order to solve the above-described problems, according to the invention, there is provided a multiprobe used as a scanning probe of a scanning probe microscope formed by providing a plurality of cantilevers on the same body, characterized in that the plurality of cantilevers have resonance frequencies different from each other and in that portions of the plurality of cantilevers to contact with a sample are arranged in a substantially liner configuration.

Since the plurality of cantilevers provided on the same body have resonance frequencies different from each other, when the multiprobe is operated in a DFM mode, it is possible to put only a required cantilever close to a surface of a sample to involve it in measurement by applying vibrations having the resonance frequency of the cantilever required for the measurement to the multiprobe thereby causing only the required cantilever to vibrate with an amplitude greater than those of the rest of the cantilevers as a result of resonance. That is, the multiprobe is operated in a DFM mode; the plurality of cantilevers are provided with peaks of resonance which are different from each other to such a degree that an operating point can be fixed; and the frequency of vibrations for external excitation is made substantially equal to the resonance frequency of a cantilever to be selected to involve only the cantilever in measurement as a result of an increased vibration amplitude. This makes it very easy to operate the plurality of cantilevers selectively.

While it is not required to provide each of the cantilevers with a scanning needle, since portions of the cantilevers to contact with a surface of a sample are arranged in a substantially linear configuration, the contact portions of those cantilevers are at similar distances to the sample during approach.

A self-detection type probe may be provided having a configuration as described above in which each of the plurality of cantilevers incorporates a distortion sensor for detecting deflection of the cantilever. In this case, the distortion sensors are set at the same characteristics.

The present invention proposes a method of measurement in which the distortion sensor of at least one cantilever uninvolved in measurement is used as a reference distortion sensor for measuring the output of the distortion sensors of the cantilevers involved in the measurement to improve the signal-to-noise ratio of the measurement.

An alternative configuration is possible in which a reference cantilever is separately provided and in which the reference cantilever is equipped with a distortion sensor similar to those of cantilevers for measurement as a reference distortion sensor.

The present invention proposes a scanning probe microscope which utilizes a multiprobe as described above and in which cantilevers can be selected and switched by substantially matching the frequency of vibration applied to the multiprobe with resonance frequency of a desired cantilever of the multiprobe.

DETAILED DESCRIPTION OF PREFERRED EMBODIMENTS

An embodiment of the present invention will now be described in detail with reference to the drawings.

Figure 1:
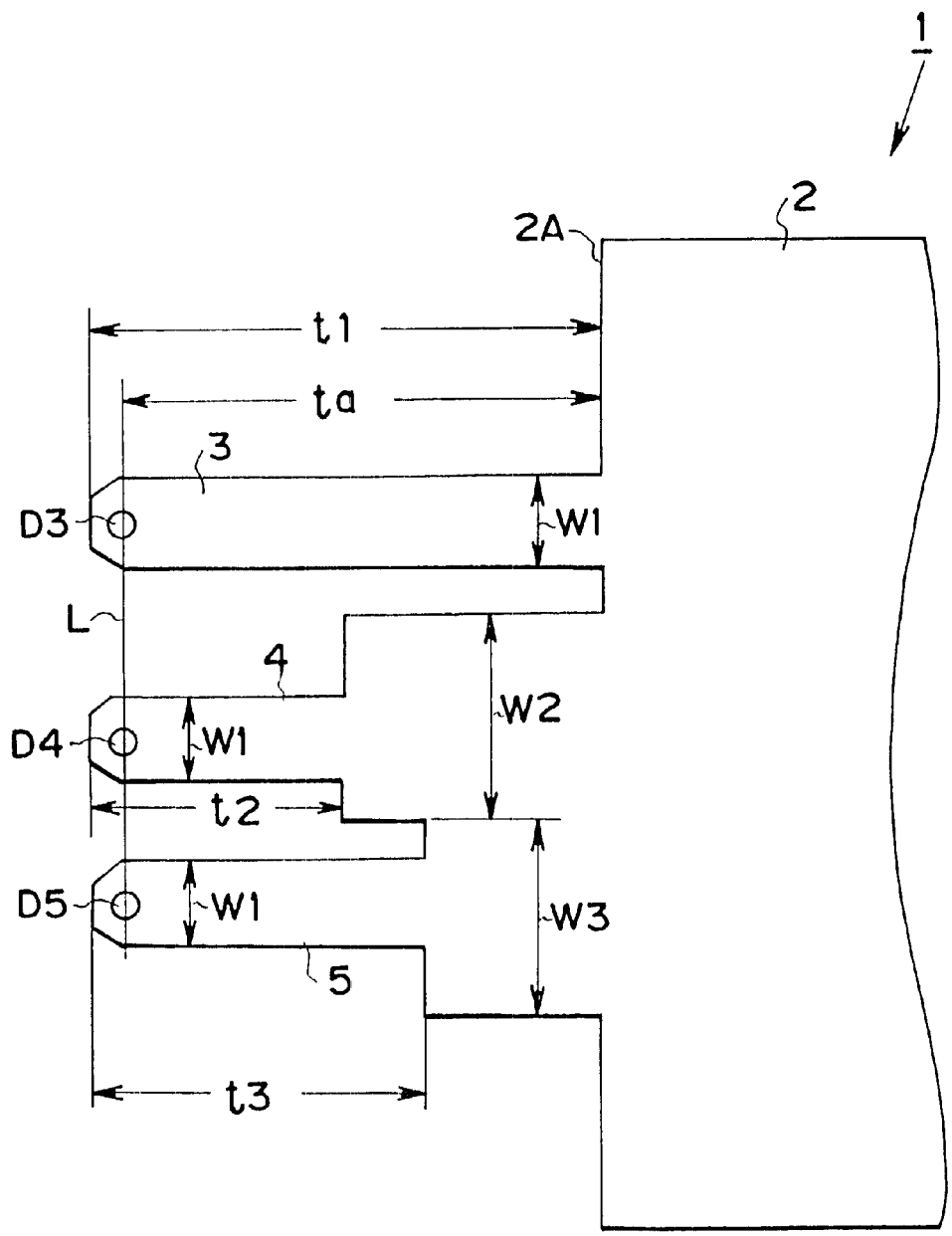
FIG. 1 is an enlarged plan view of a major part of an embodiment of a multiprobe according to the invention.

FIG. 1 is an enlarged view of a major part of an embodiment of a multiprobe according to the present invention. A multiprobe 1 is used as a scanning probe of a scanning probe microscope used for finding changes in a surface configuration, a physical quantity and the like of a microscopic region on the order of atoms and has three cantilevers 3, 4 and 5 provide on a body 2.

The cantilever 3 is provided on the body 2 such that it extends from the body 2 with a width W1 and a length t1. The cantilever 4 has the width W1 at the end thereof and has a width W2 greater than the width W1 at the base thereof, and the region with the width W1 has a length t2 (<t1). The cantilever 5 has the width W1 at the end thereof and has a width W3 greater than the width W1 at the base thereof, and the region with the width W1 has a length t3 (t1>t3>t2). W2 is equal to W3 in the present embodiment.

Since the cantilevers 3, 4 and 5 have the above-described configurations, respective resonance frequencies f3, f4 and f5 substantially depend on the lengths of the regions having the width W1 and satisfy the following relationship.

$$f3<f5<f4$$

Spring constants k3, k4 and k5 of the cantilevers 3, 4 and 5 also depend on the lengths of the respective regions having the width W1 and satisfy the following relationship in terms of the magnitudes thereof.

$$k3<k5<k4$$

Reference symbols D3, D4 and D5 respectively represent scanning needles of the cantilevers 3, 4 and 5 which are portions of the cantilevers 3, 4 and 5 to contact with a sample. The scanning needles D3, D4 and D5 are all located at a distance from a reference surface 2A of the body 2. As a result, the scanning needles D3, D4 and D5 are arranged on a straight line L to provide a linear configuration. Obviously, cantilevers without scanning needles may be used which have no scanning needle and contact with a sample in a part of the ends thereof. In this case, the portions of the cantilevers to contact a sample may be arranged in a linear configuration.

Figure 2:
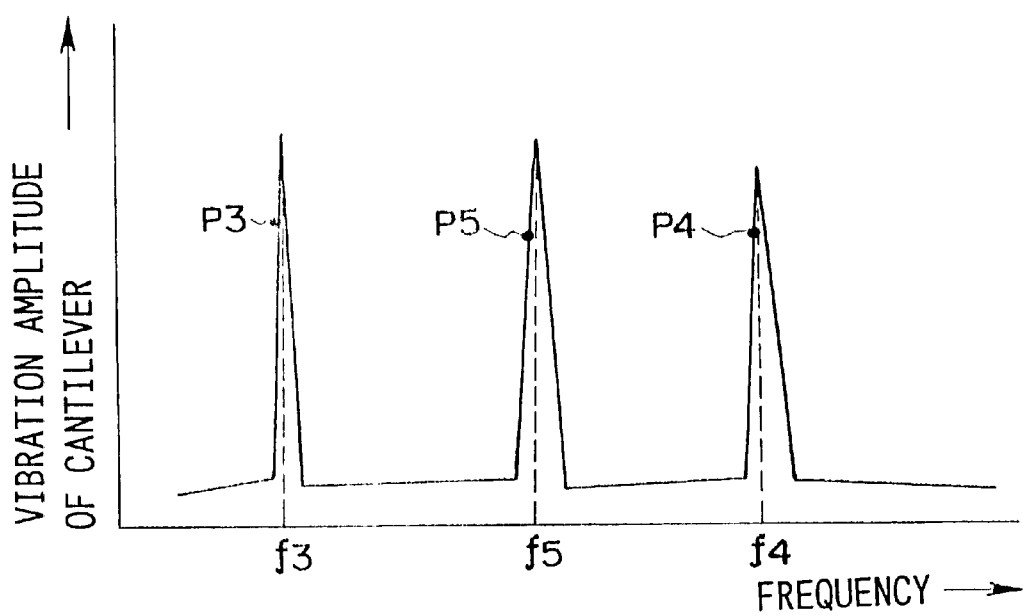
FIG. 2 is a characteristics diagram showing resonance frequency characteristics of the multiprobe shown in FIG. 1.

FIG. 2 is a diagram showing resonance frequency characteristics of the multiprobe 1. As shown in FIG. 2, there are peaks of resonance at the resonance frequencies f3, f4 and f5 of the respective cantilevers 3, 4 and 5. Therefore, the cantilevers 3, 4 and 5 can be selectively used by setting operating points P3, P4 and P5 in the vicinity of the respective peaks of resonance.

Since the multiprobe 1 has the three cantilevers 3, 4 and 5 having resonance frequencies and spring constants different from each other as described above, when external vibrations are applied to the multiprobe 1 to cause the multiprobe 1 to operate in a DFM mode, only a desired cantilever can be used for measurement of a sample (not shown) by substantially matching the frequency of the vibrations with the resonance frequency of the desired cantilever to be used for the measurement to cause the desired cantilever to vibrate with an amplitude sufficiently greater than those of the other cantilevers.

It is therefore possible to select a cantilever having a desired spring constant for measurement by simply changing the frequency of vibrations applied to the multiprobe 1 without a need for a complicated switching mechanism utilizing a piezoelectric element. This eliminates a need for troublesome operations for replacing cantilevers as in the prior art and allows continuous measurement using three kinds of cantilevers having different spring constants by simply changing the frequency of vibrations for excitation.

Since the scanning needles D3, D4 and D5 of the cantilevers 3, 4 and 5 are in a linear configuration in which they are arranged on a straight line L, the scanning needles D3, D4 and D5 can be located at similar distances from a sample during an approaching operation in which the multiprobe 1 is caused to approach the sample. As a result, the approaching operation can be similarly performed regardless of which of the cantilevers 3, 4 and 5 is selected and used.

Since the multiprobe 1 has characteristics as described above, a cantilever having an optimum spring constant can be easily selected in accordance with the hardness and quality of the sample. With an appropriate number of cantilevers having different spring constants prepared on the same body, it is possible to perform optimum measurement for a sample by simply changing the frequency of vibrations for excitation.

Figure 3:
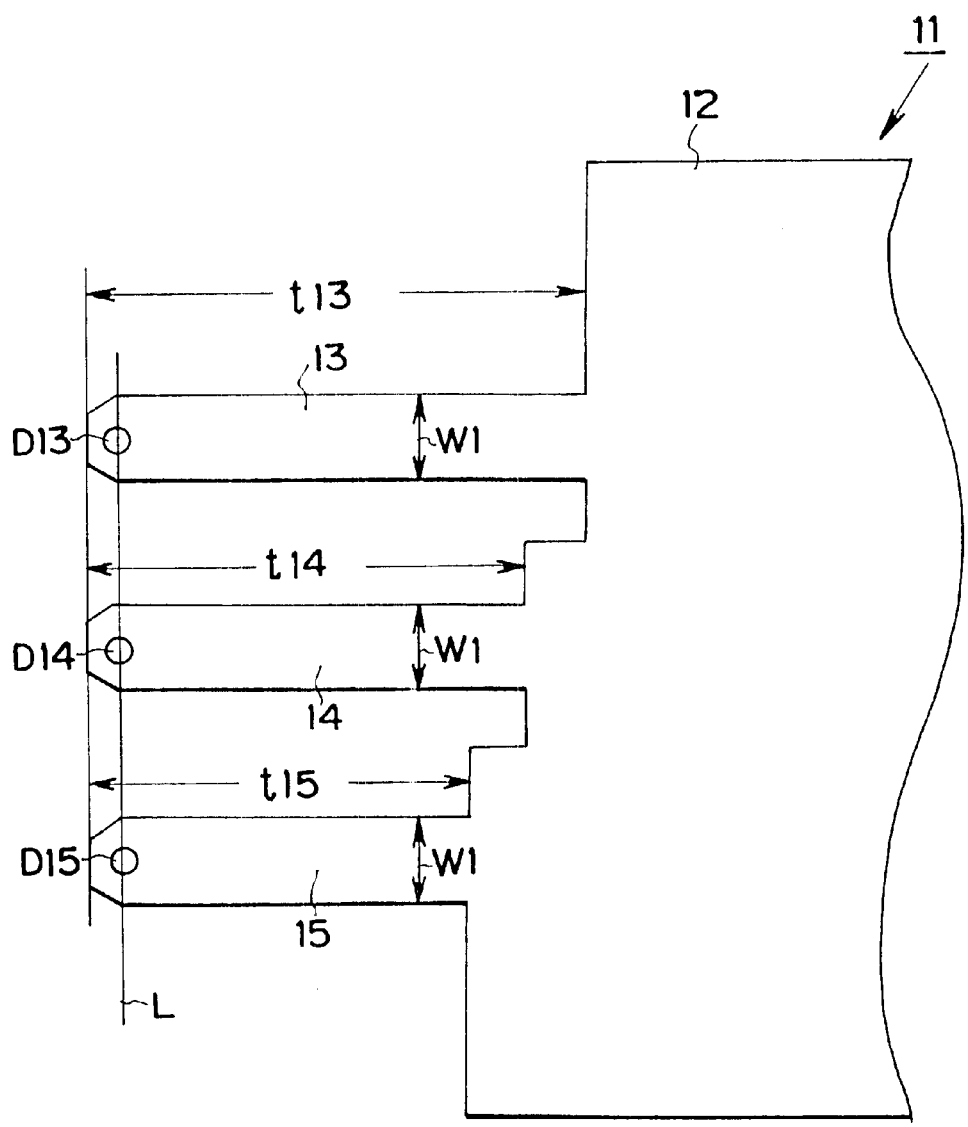
FIG. 3 is an enlarged plan view of a major part of another embodiment of a multiprobe according to the invention.

FIG. 3 shows another embodiment of a multiprobe according to the present invention. A multiprobe 11 shown in FIG. 3 is also formed by providing three cantilevers 13, 14 and 15 on a body 12. However, the lengths t13, t14 and t15 of regions having a width W1 of the cantilevers 13, 14 and 15 are not significantly different from each other, and they have substantially equal spring constants. They are characterized in that their resonance frequencies are similar but are different from each other to a degree at which their respective peaks of resonance can be discriminated from each other.

Figure 4:
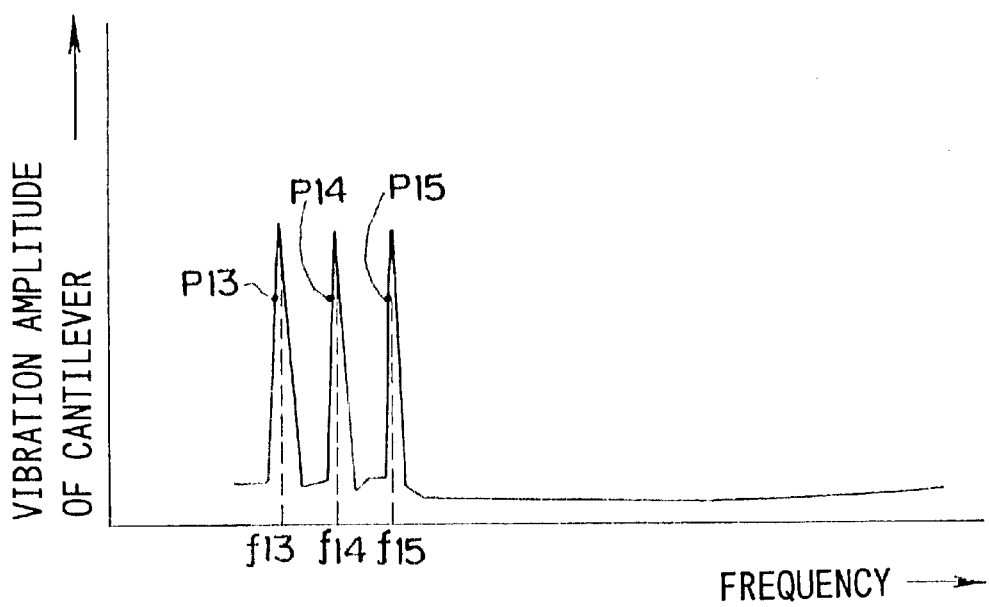
FIG. 4 is a characteristics diagram showing resonance frequency characteristics of the multiprobe shown in FIG. 3.

FIG. 4 shows resonance frequency characteristics of the multiprobe 11. While resonance frequencies f13, f14 and f15 of the respective cantilevers 13, 14 and 15 are rather close to each other compared to those in FIG. 1, respective operating points P13, P14 and P15 can be discriminated from each other, and spring constants k13, k14 and k15 of the respective cantilevers 13, 14 and 15 are substantially equal to each other.

Thus, in the multiprobe 11 shown in FIG. 3, the differences between the lengths t13, t14 and t15 of the regions having the width W1 of the cantilevers 13, 14 and 15 are smaller than those in the embodiment shown in FIG. 1. As a result, the resonance frequencies f13, f14 and f15 are closer to each other, and the spring constants k13, k14 and k15 are substantially equal to each other. Scanning needles D13, D14 and D15 of the respective cantilevers 13, 14 and 15 are also arranged in a linear configuration.

Since the multiprobe 11 has the above-described configuration, the cantilevers 13, 14 and 15 can be sequentially and selectively used for measurement by changing the frequency of vibrations applied to the multiprobe 11 slightly step-by-step to f13, f14 and f15. It is therefore possible to sequentially and selectively use the cantilevers having substantially equal spring constants for measurement to measure a sample continuously by performing the measurement with the frequency changed slightly step-by-step.

As apparent from the above description, the multiprobe 1 is suitable for measurement using a cantilever selected for an optimum spring constant, and the multiprobe 11 is suitable for performing measurement continuously for a long period of time under constant conditions with cantilevers switched.

Both of the multiprobes 1 and 11 are advantageous in that an approaching operation is simplified because of the linear configuration of the scanning needles which allows any of the scanning needles to be kept at the same distance from a sample during the approaching operation to put the cantilevers in the first contact with the sample.

Figure 5:
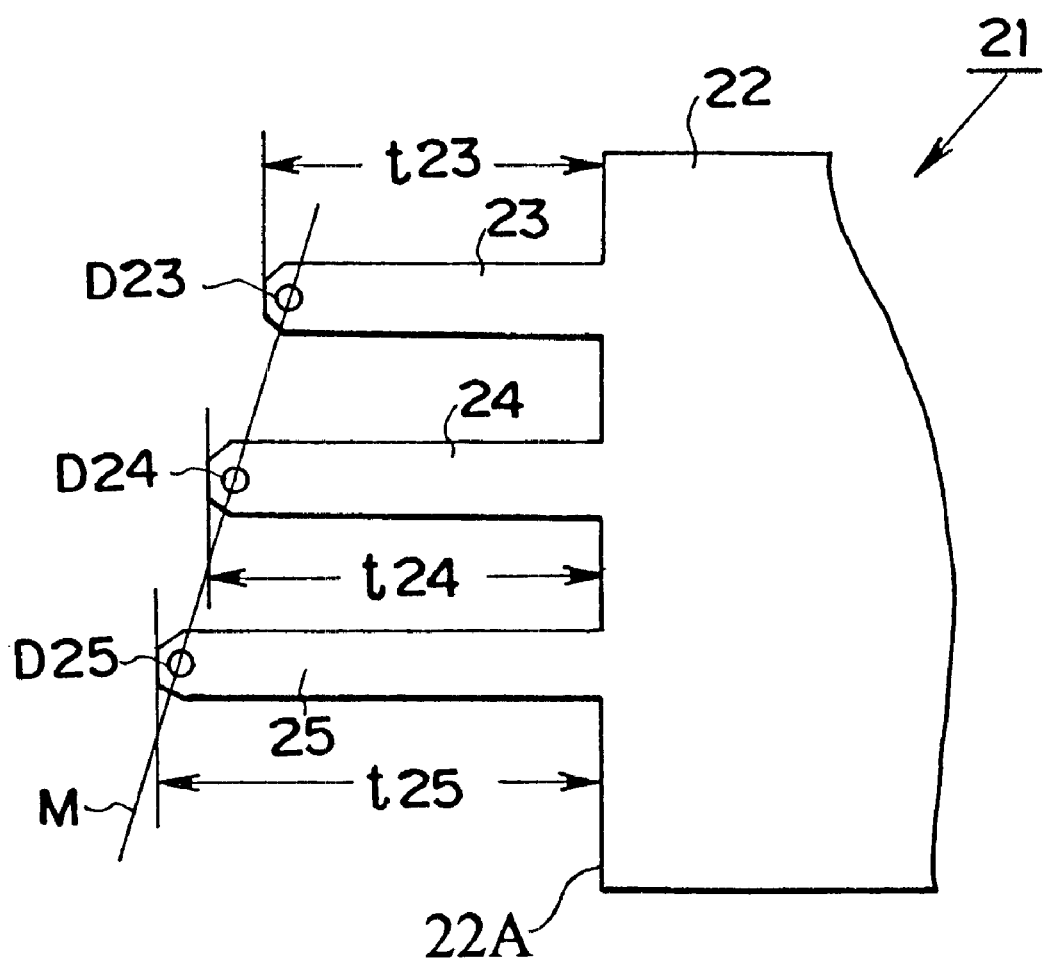
FIG. 5 is an enlarged plan view of a major part of still another embodiment of a multiprobe according to the invention.

FIG. 5 shows still another embodiment of a multiprobe according to the present invention. A multiprobe 21 has cantilevers 23, 24 and 25 having the same width W1 and different lengths provided on a body 22. The cantilevers 23, 24 and 25 have lengths t23, t24 and t25 respectively (t23<t24<t25), and scanning needles D23, D24 and D25 are arranged on a straight line M at the respective ends to provide a linear configuration.

In the multiprobe 21, since the bases of the cantilevers 23, 24 and 25 are aligned with the level of a lateral surface 22A of the body 22, the intervals between the cantilevers 23, 24 and 25 can be smaller than those in the configurations of the embodiments shown in FIGS. 1 and 3 in which wider regions are provided at the bases to prevent the occurrence of crosstalk, which is advantageous in achieving compactness. The multiprobe 21 can be used similarly to the multiprobe 1 or 11 by setting the lengths of the cantilevers 23, 24 and 25 appropriately.

Figure 6:
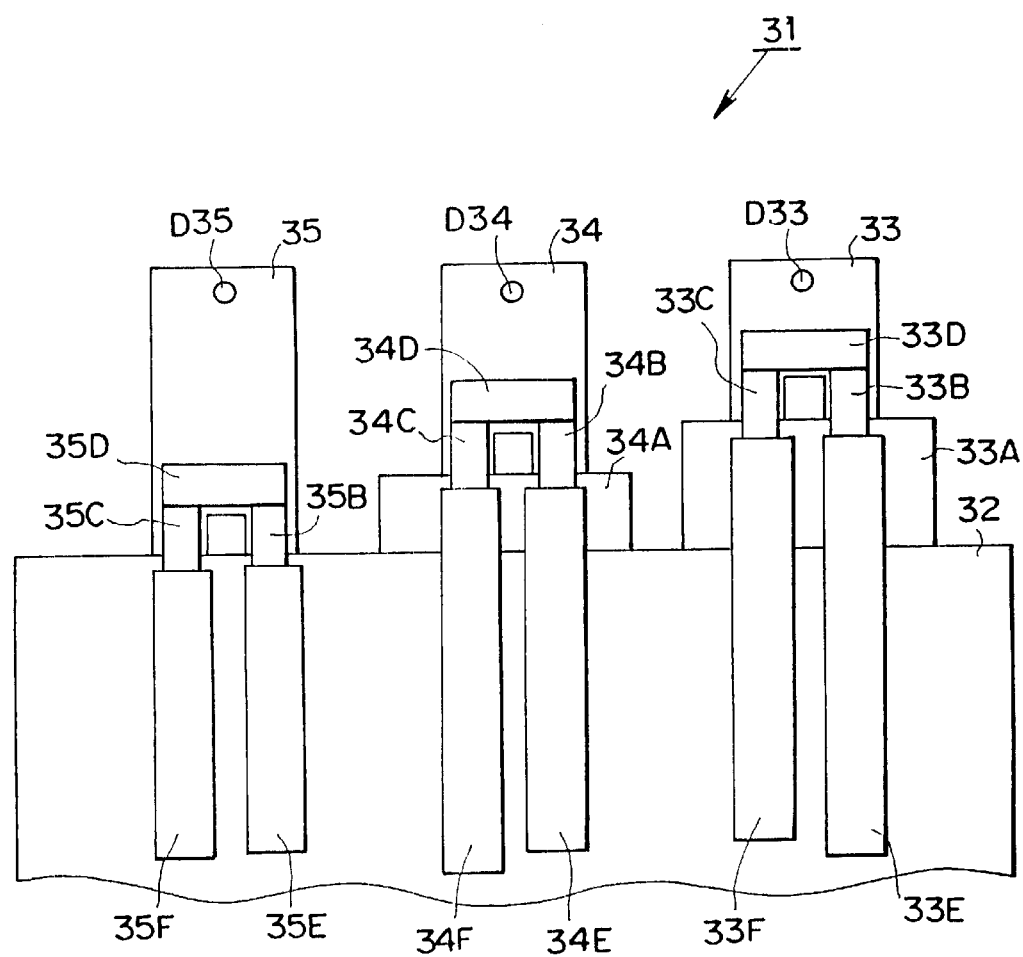
FIG. 6 is an enlarged plan view of a major part of the multiprobe in FIG. 1 showing a more specific configuration of the same.

FIG. 6 shows the embodiment shown in FIG. 1 more specifically. A multiprobe 31 shown in FIG. 6 is an example of a self-detection type multiprobe which utilizes resistive elements as sensors and in which cantilevers 33, 34 and 35 are provided on a body 32. While the cantilevers 33, 34 and 35 have the same length, the cantilevers 33 and 34 are formed with wide base portions 33A and 34A. As a result, resonance frequencies f33, f34 and f35 of the respective cantilevers 33, 34 and 35 are in the following relationship with each other.

$$f33>f34>f35$$

Respective spring constants k33, k34 and k35 are in the following relationship with each other.

$$k33>k34>k35$$

In order to electrically detect deflection of the cantilever 33, the cantilever 33 is provided with piezoresistance layers 33B and 33C formed using ion implantation. The piezoresistance layers 33B and 33C have a configuration in which they can be connected to a detection circuit (not shown) by wires 33D, 33E and 33F constituted by metal films made of aluminum or the like.

While a configuration for detecting deflection of the cantilever 33 has been described, the cantilevers 34 and 35 will not be described because they have similar configurations in which reference symbols 34C through 34F and 35C through 35F corresponding to the reference symbols 33C through 33F are shown.

While either separate wiring or series wiring may be used for the sensors, separate wiring is preferred in that it provides higher sensitivity. When one of the cantilevers is selected, the sensor provided on another cantilever may be used as a reference element to obtain measurement data by eliminating drifts and noises.

Figure 7:
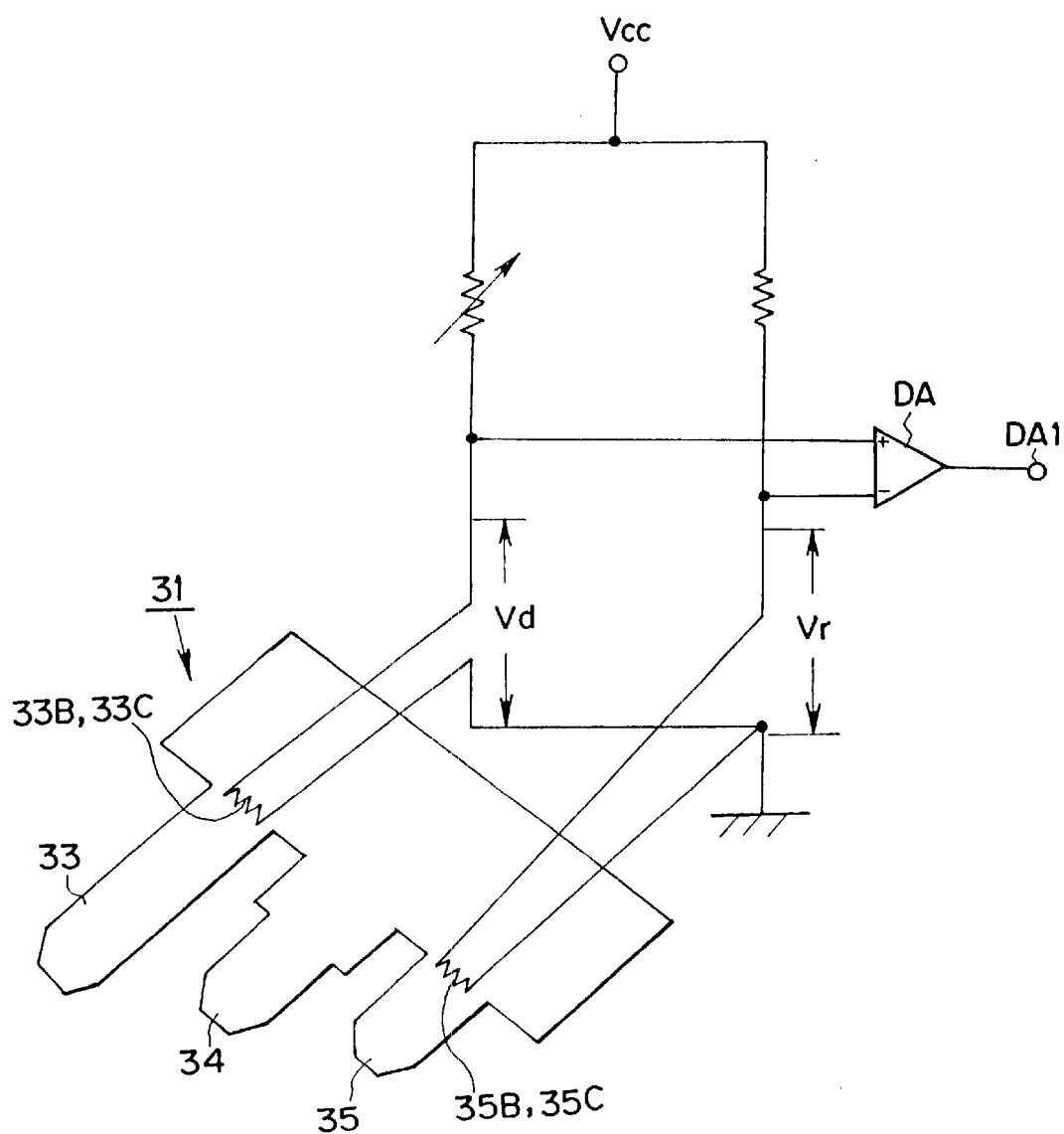
FIG. 7 is a circuit diagram of an example of a circuit configuration for measuring a sample utilizing the multiprobe shown in FIG. 6.

FIG. 7 shows an example of a circuit configuration for performing such measurement. In the example of a circuit configuration shown in FIG. 7, when the cantilever 33 is used for measurement, a differential amplifier DA is used to find the difference between a detection voltage Vd generated at the piezoresistance layers 33B and 33C and a detection voltage Vr generated at the piezoresistance layers 35B and 35C of the cantilever 35 which is not used for measurement. It is possible to obtain a voltage signal representing deflection of the cantilever 33 having less drifts and noises from an output DA1 of the same.

Figure 8:
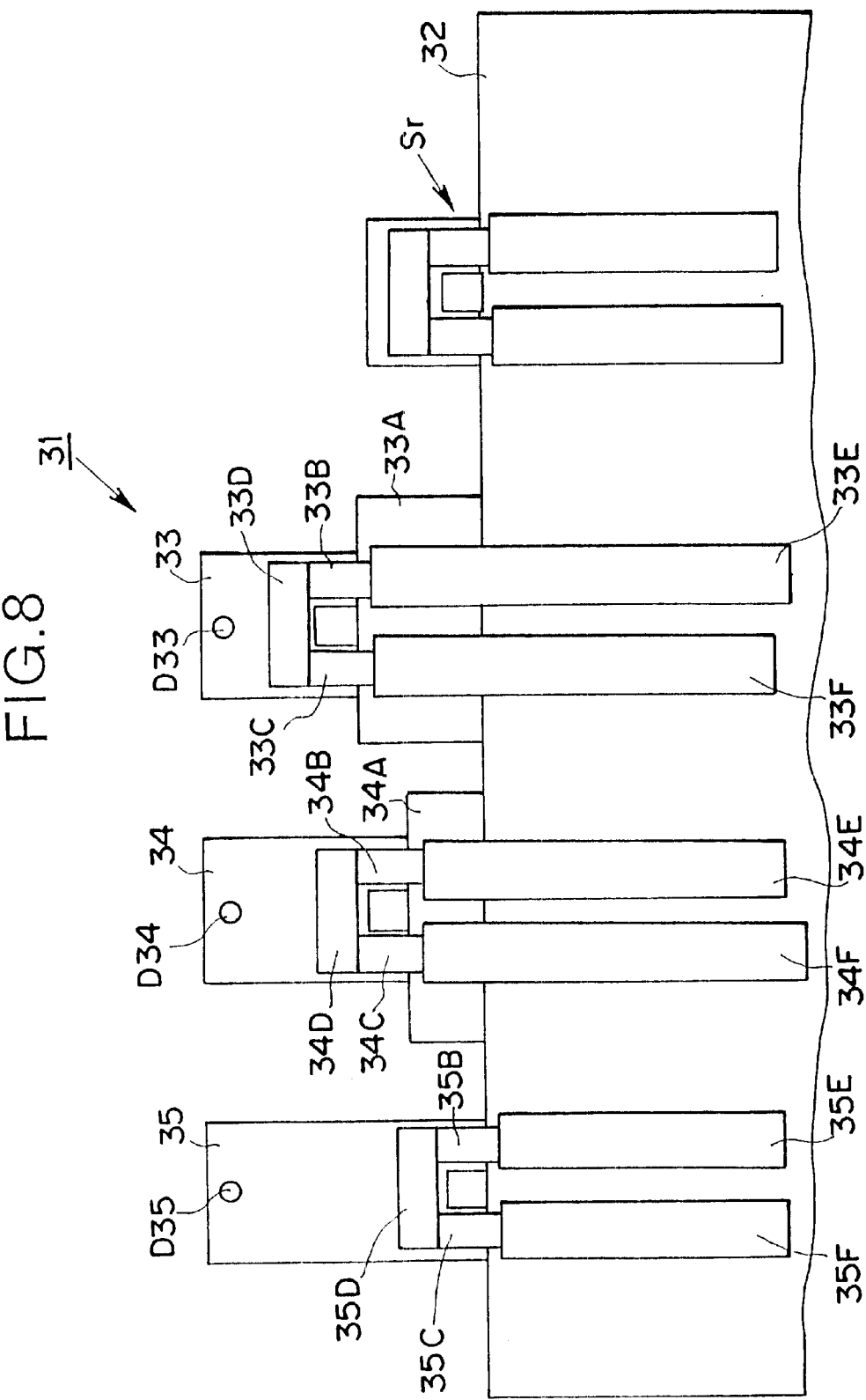
FIG. 8 is an enlarged plan view of a major part of the multiprobe shown in FIG. 7 showing a more specific configuration of the same.

FIG. 8 shows a modification of the multiprobe 31 shown in FIG. 7, and a multiprobe 31' shown in FIG. 8 has a reference sensor Sr which is separately provided in a reference cantilever within the array of probes. Since the configuration of the multiprobe 31' is otherwise the same as that of the multiprobe 31, the description for the same will be omitted with parts of the multiprobe 31' corresponding to those of the multiprobe 31 indicated by like reference symbols. The reference sensor Sr has the completely same configuration as that of the sensor provided on each of the cantilevers 33, 34 and 35 and can be fabricated simultaneously with them.

Figure 9:
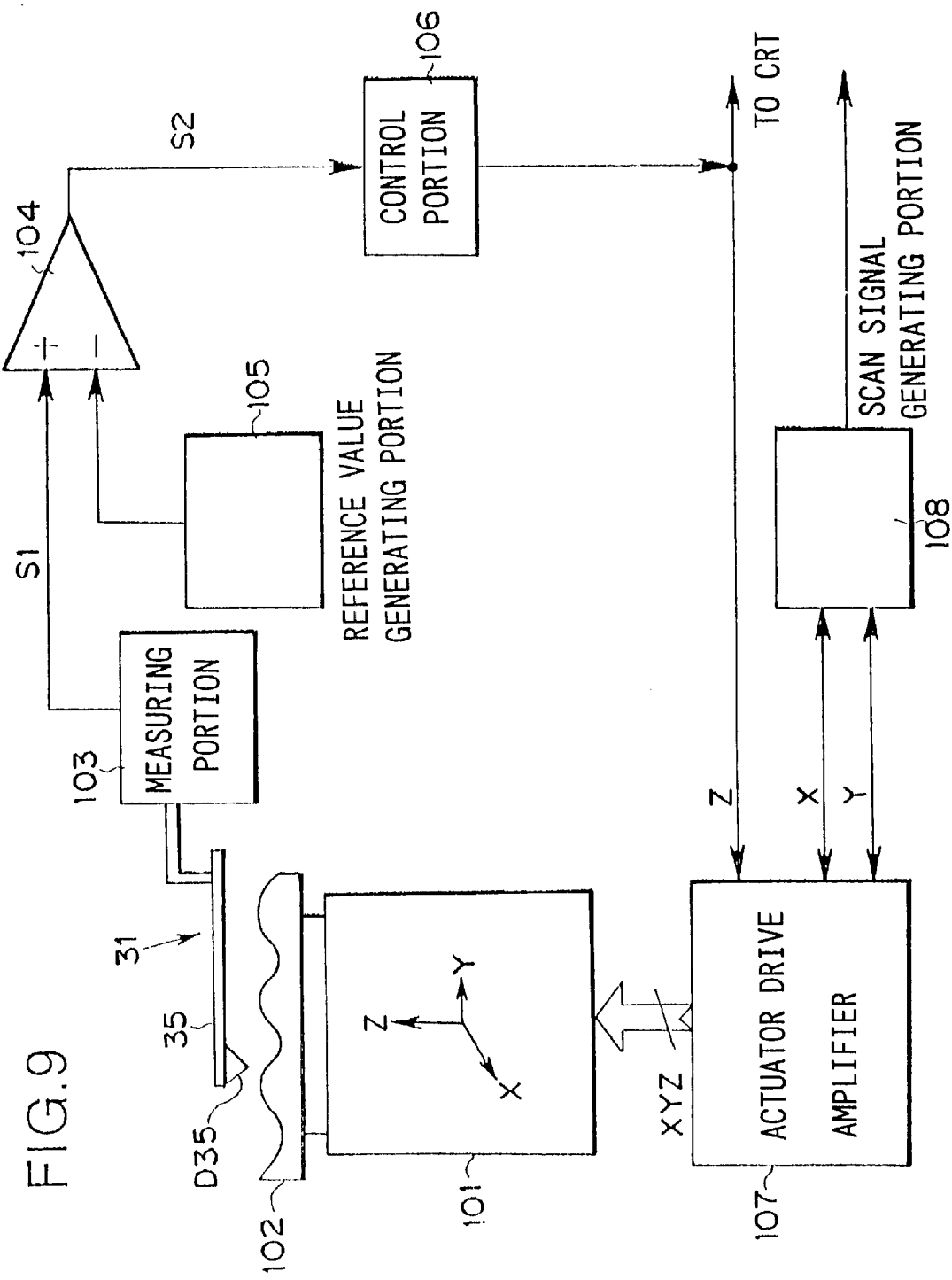
FIG. 9 is a block diagram of an example of a configuration of a scanning probe microscope utilizing the multiprobe shown in FIG. 6.

FIG. 9 is a block diagram showing a general configuration of a scanning probe microscope apparatus utilizing a multiprobe 31 according to the invention as described above. A sample 102 is placed on a three-dimensional sample stage 101 serving as means for controlling relative movement between the multiprobe 31 and the sample, and the multiprobe 31 is provided above the sample 102 in a face-to-face relationship.

Vibrations are applied to the multiprobe 31 from a vibrator serving as means for vibrating the multiprobe 31 (not shown) and, in the example shown in FIG. 9, the vibration frequency is set at the resonance frequency f35 of the cantilever 35, and the scanning needle D35 of the cantilever 35 taps a surface of the sample 102 (see FIG. 6).

A measuring portion 103 applies a bias signal to the piezoresistance layers 35B and 35C of the multiprobe 31 and amplifies an output signal that is in accordance with displacement of the cantilever 35. A detection signal S1 of the multiprobe 31 detected by the measuring portion 103 is input to a non-inverting input terminal (+) of a differential amplifier 104.

A reference value for the detection signal from the multiprobe 31 is input from a reference value generating portion 105 to an inverting input terminal (−) of the differential amplifier 104 such that, for example, the output of the differential amplifier 104 is set at 0 when the deflection of the cantilever 35 is 0. As described with reference to FIG. 7, the sensor of another cantilever which is not involved in the measurement may be used as the reference value generating portion 105.

An error signal S2 output by the differential amplifier 104 is input to a control portion 106. The control portion 106 controls an actuator drive amplifier 107 such that the error signal S2 approaches 0. An output signal from the control portion 106 is output to a CRT as a luminance signal. A scan signal generating portion 108 outputs a signal to scan the sample 102 in X- and Y-directions to the actuator drive amplifier 107, and the CRT outputs a raster scan signal. As a result, a three-dimensional image associated with the output signal of the multiprobe 31 is displayed on the CRT. Only a general configuration of the apparatus has been described above, and the apparatus may be configured in other ways as long as the same functions and the like are maintained.

According to the present invention, since one of a plurality of cantilevers prepared in advance can be selectively involved in measurement only by changing the frequency of vibration, it is possible to eliminate troublesome operations such as replacing probes and breaking cantilevers.

Therefore, when measurement is carried out using cantilevers having different spring constants for the reason that observation data can vary if the measurement is carried out using cantilevers having different spring constants depending on the hardness and quality of the sample, there is no need for repeating the measurement from the beginning with the cantilevers on the body replaced. Instead, by preparing cantilevers having different spring constants, continuous measurement can be carried out by changing the resonance frequency to switch the cantilevers, which allows optimum measurement to be performed easily. It is therefore possible to provide a multiprobe and a scanning probe microscope which are quite easy to operate.

What is claimed is:

1. A multiprobe comprising: a support body; and a plurality of cantilevers provided on the support body each being selectable for use as a scanning probe of a scanning probe microscope, the plurality of cantilevers each having a different resonance frequency from the others; wherein portions of the respective plurality of cantilevers which are brought into contact with a sample to conduct scanning probe measurements are arranged in a substantially linear configuration.

2. In a scanning probe microscope; a multiprobe according to claim 1 for measuring a sample, wherein the frequency of vibrations applied to the multiprobe is set so that only one of the plurality of cantilevers is involved in the measurement.

3. A multiprobe according to claim 1; wherein peaks of resonance of the cantilevers are different to a sufficient degree so that an operating point can be fixed at which only one of the cantilevers can be used to conduct scanning probe measurements.

4. A multiprobe comprising: a support body; a plurality of cantilevers provided on the support body each being selectable for use as a scanning probe of a scanning probe microscope, the plurality of cantilevers each having a different resonance frequency different from the others, portions of the respective plurality of cantilevers which are brought into contact with a sample to conduct scanning probe measurements being arranged in a substantially linear configurations; and a sensor for detecting distortion incorporated in each of the cantilevers to allow a self-detecting configuration.

5. A multiprobe according to claim 4; wherein the sensors all have the same configuration.

6. In a scanning probe microscope; a multiprobe according to claim 4 for measuring a sample, wherein the frequency of vibrations applied to the multiprobe is set so that only one of the plurality of cantilevers is involved in the measurement.

7. In a scanning probe microscope according to claim 6; wherein the sensor of a cantilever uninvolved in the measurement serves as a reference for eliminating distortion detected by the sensor of the cantilever involved in the measurement, so as to improve a signal-to-noise ratio of the measurement.

8. A multiprobe according to claim 4; further comprising a reference cantilever having therein a reference sensor having characteristics similar to those of the sensors incorporated in the plurality of cantilevers.

9. In a scanning probe microscope; a multiprobe according to claim 8 for measuring a sample, wherein the frequency of vibrations applied to the multiprobe is set so that only one of the plurality of cantilevers is involved in the measurement.

10. In a scanning probe microscope according to claim 9; wherein the reference sensor incorporated in the reference cantilever serves as a reference for eliminating distortion detected by the sensor of the cantilever involved in the measurement, so as to improve a signal-to-noise ratio of the measurement.

11. A multiprobe according to claim 1; wherein each of the cantilevers comprises an elongated member extending from the support body.

12. A multiprobe according to claim 1; wherein the portion of the respective cantilevers that is brought into contact with a sample comprises a needle formed on the respective cantilevers.

13. A multiprobe according to claim 12; wherein one end of the cantilevers is attached to the support body and the needle is formed proximate a distal end of the cantilevers opposite the support body.

14. A multiprobe according to claim 1; wherein the support body has a leading surface from which the plurality of cantilevers extend, each of the cantilevers has a first portion having a first length in a direction extending outward from the support body and a first width in a direction parallel to the leading surface of the support body, and one or more of the cantilevers has a second portion having a second width larger than the first width.

15. A multiprobe according to claim 14; wherein the second portion is formed at the support body end of the cantilevers.

16. A multiprobe according to claim 14, wherein the resonance frequency of cantilevers having the second portion is larger than that of cantilevers not having the second portion.

17. A multiprobe according to claim 14; wherein a plurality of the cantilevers have the second portion, and the second portion has a different length in each cantilever.

18. A multiprobe according to claim 1; wherein the resonance frequency of the respective cantilevers depends upon a length of the first portion thereof such that cantilevers having a shorter first portion have a smaller resonance frequency.

19. A multiprobe according to claim 1; wherein a spring constant of the respective cantilevers depends upon a length of the first portion thereof such that cantilevers having a shorter first portion have a larger spring constant.

20. A multiprobe according to claim 1; wherein the cantilevers have distal ends having needles arranged along a straight line parallel to a leading edge of the support body.

21. A multiprobe which is a probe device for a scanning probe instrument and has a plurality of individually-selectable probe members for conducting scanning probe operations, comprising: a support member; and a plurality of cantilevers supported by the support member each being individually-selectable for use in conducting scanning probe operations, each of the cantilevers having a different resonance frequency from the other cantilevers.

22. A multiprobe according to claim 21; wherein portions of the respective cantilevers brought into contact with a sample to conduct scanning probe operations are arranged in a substantially linear configuration.

23. A scanning probe microscope comprising: a multiprobe according to claim 21 for measuring a sample; means for controlling relative movement between the multiprobe and the sample; means for vibrating the multiprobe at a resonance frequency of one of the cantilevers to select the one cantilever for conducting measurements of the sample; means for detecting displacement of the selected the cantilever while the cantilever is scanned across the surface of the sample and converting the detected displacement into an electrical signal; and means for converting the electrical signal into an image signal representing a surface of the sample.

24. A scanning probe microscope according to claim 23; further comprising a sensor provided on each of the cantilevers to detect deflection of the cantilevers.

25. A scanning probe microscope according to claim 24; wherein the sensor of a non-selected cantilever serves as a reference for eliminating distortion detected by the sensor of the cantilever involved in the measurement, so as to improve a signal-to-noise ratio of the measurement.

26. A multiprobe according to claim 21; wherein peaks of resonance of the cantilevers differ only to a sufficient degree such that only one of the cantilevers can be used to conduct scanning probe measurements.

27. A multiprobe according to claim 21; further comprising a sensor provided on each of the cantilevers to detect deflection of the cantilevers.

* * * * *